(12) United States Patent
Nishimura et al.

(10) Patent No.: US 8,146,248 B2
(45) Date of Patent: Apr. 3, 2012

(54) CONSTRUCTION FOR STOPPING WATER FROM PENETRATING INTO DRAIN WIRE CONTAINED IN SHIELDED WIRE AND METHOD FOR STOPPING WATER FROM PENETRATING THEREINTO

(75) Inventors: Naoya Nishimura, Yokkaichi (JP);
Toshio Kometani, Yokkaichi (JP);
Masahiro Hagi, Yokkaichi (JP);
Hirotaka Baba, Yokkaichi (JP);
Yoshiaki Yamano, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 790 days.

(21) Appl. No.: 12/223,169

(22) PCT Filed: Jan. 29, 2007

(86) PCT No.: PCT/JP2007/051350
§ 371 (c)(1),
(2), (4) Date: Jul. 24, 2008

(87) PCT Pub. No.: WO2007/088798
PCT Pub. Date: Aug. 9, 2007

(65) Prior Publication Data
US 2009/0126993 A1    May 21, 2009

(30) Foreign Application Priority Data

Feb. 2, 2006 (JP) ................................. 2006-026382
Jun. 28, 2006 (JP) ................................. 2006-178651
Aug. 7, 2006 (JP) ................................. 2006-214588
Sep. 26, 2006 (JP) ................................. 2006-260586
Jan. 10, 2007 (JP) ................................. 2007-002370

(51) Int. Cl.
*H01R 43/00* (2006.01)

(52) U.S. Cl. ............ 29/859; 29/828; 29/858; 29/564.4; 174/28; 174/71 C; 427/120

(58) Field of Classification Search .................. 29/828, 29/858, 859, 564.4; 174/28, 71 C; 427/120
See application file for complete search history.

(56) References Cited

U.S. PATENT DOCUMENTS

| 5,888,323 A | 3/1999 | Yasukuni et al. |
| 6,514,064 B2 | 2/2003 | Kondo |
| 6,517,381 B2 | 2/2003 | Kondo |
| 6,613,263 B2 | 9/2003 | Kondo |

(Continued)

FOREIGN PATENT DOCUMENTS

EP    0 720 179 A2    7/1996

(Continued)

*Primary Examiner* — A. Dexter Tugbang
*Assistant Examiner* — Jeffrey T Carley
(74) *Attorney, Agent, or Firm* — Oliff & Berridge, PLC

(57) ABSTRACT

A Drain wire led out from the interior to the exterior of a shielded wire is covered with a heat shrinkable tube made of an insulating resin or with a rubber tube including silicon or EPDM (ethylene-propylene rubber). A water-stop agent is penetrated between the element wires of the drain wire in the heat shrinkable tube or the rubber tube. In addition, A boundary portion between a terminal connected to an end of the drain wire and the heat shrinkable tube is covered with a rubber stopper.

6 Claims, 12 Drawing Sheets

U.S. PATENT DOCUMENTS

2004/0238200 A1    12/2004    Tanaka et al.
2005/0095892 A1*    5/2005    Fukuyama .................... 439/287
2005/0221650 A1*    10/2005    Yagi et al. .................... 439/164

FOREIGN PATENT DOCUMENTS

| | | |
|---|---|---|
| JP | A-4-237979 | 8/1992 |
| JP | A-6-124608 | 5/1994 |
| JP | A-8-185722 | 7/1996 |
| JP | A-10-40744 | 2/1998 |
| JP | A-2000-11771 | 1/2000 |
| JP | A-2001-167821 | 6/2001 |
| JP | A-2002-208321 | 7/2002 |
| JP | A-2003-151368 | 5/2003 |
| JP | A-2004-72943 | 3/2004 |
| JP | A-2004-355851 | 12/2004 |
| JP | A-2005-142113 | 6/2005 |

\* cited by examiner

[Prior Art]

[Prior Art]

ic wires 2 are sequentially covered with a shielded layer 4 and a
CONSTRUCTION FOR STOPPING WATER FROM PENETRATING INTO DRAIN WIRE CONTAINED IN SHIELDED WIRE AND METHOD FOR STOPPING WATER FROM PENETRATING THERETO

TECHNICAL FIELD

The present invention relates to a method for stopping water from penetrating into a drain wire contained in a shielded wire and a wire harness having a construction for stopping water from penetrating into the drain wire. More particularly the present invention is intended to make slim the construction for stopping water from penetrating into the drain wire led out from an end of the shielded wire disposed in a waterproof region such as an engine room of a vehicle.

BACKGROUND ART

In an electric wire disposed in a car, a shielded wire is used at a portion demanded to shield noise. As shown in FIG. 15(A), an electric wire used as a shielded wire 1 contains insulated coated electric wires (core electric wires) 2 constituting a plurality of signal wires and a drain wire 3 for grounding use. The drain wire 3 and the insulated coated electric wires 2 are sequentially covered with a shielded layer 4 and a sheath 5 made of an insulating resin material (patent document 1).

The drain wire 3 is made of a large number of conductive strands which are not covered with an insulating coating material and in contact with the shielded layer 4 made of a tube of metal braid or a metal foil.

As shown in FIG. 15(B), to mount the shielded wire 1 on a connector housing, it is necessary to process an end of the shielded wire 1. That is, it is necessary to perform the process of stripping the sheath 5 and the shielded layer 4 in a length of 80 to 200 mm, strip the end of the exposed coated electric wire 2 to mount a terminal fitting 7 on the coated electric wire 2 by solderless connection, mount a terminal 8 on the drain wire 3, and insert the terminals 7, 8 into the connector housing so that the terminals 7, 8 can be mechanically connected with a mating appliance.

In connecting the terminal with the end of an electric wire disposed in a waterproof region such as an engine room of a vehicle and the like and connecting the terminal with a connector, in Japanese Patent Application Laid-Open No. 2001-167821 (patent document 2), there is disclosed a water-stopping method to be carried out by molding a connection portion of a terminal including an exposed portion of a core wire with a sealing resin having a high viscosity.

In connecting the shielded wire with an appliance inside the engine room to be waterproofed, the drain wire not covered with an insulating coating material is also led out from the end of the shielded wire. Therefore water penetrates into the appliance through the drain wire. Thus as shown in FIG. 16, the insulated coated electric wire 9 is added to the end of the drain wire 3, and the end of the drain wire 3 is spliced to the core wire 9a of the insulated coated electric wire 9. In addition, after a water-stopping agent such as silicone is applied to a spliced portion, a tape is wound round the portion.

But the spliced water-stopped portion has a large diameter owing to the silicone applied thereto and causes the diameter of a wire harness to be large. The water-stopping method disclosed in the patent document 1 has also a similar problem. In recent years, because a car is increasingly equipped with electric and electronic parts, an increase of the shielded wire is expected. Therefore measures for overcoming the enlargement of the spliced water-stopped portion is getting more and more important.

In addition, because by splicing the insulated coated electric wire 9 to the drain wire 3, the shielded wire is connected to an appliance (for example, ECU). Thus the processing expenditure is high and thus the water-stopping construction costs high in the above-described conventional art.

Furthermore it is necessary to strip the shielded wire in a length (150 to 200 mm) necessary for the splicing. When the stripping length is long, the shielded wire has a low shielding performance.

Patent document 1: Japanese Patent Application Laid-Open No. 2002-208321
Patent document 2: Japanese Patent Application Laid-Open No. 2001-167821

DISCLOSURE OF THE INVENTION

Problem to be Solved by the Invention

The present invention has been made in view of the above-described problems. It is an object of the present invention to provide a construction and a method, for stopping water from penetrating into a drain wire, which has a slim water-stopping processing portion, allows water-stopping processing to be accomplished at a low cost, and has a high shielding performance.

Means for Solving the Problem

To solve the above-described problems, the present invention provides a wire harness, having a construction for stopping water from penetrating into a drain wire, which is produced by any one of first through sixth methods (described later) for stopping water from penetrating into the drain wire, wherein the drain wire led out from an end of the shielded wire is covered with a heat shrinkable tube or a rubber tube; and a water-stopping agent is filled between strands of the drain wire contained inside the tube.

In this water-stopping construction, even though water penetrates into the tube covering the drain wire from the end thereof, the penetration of the water can be prevented by the water-stopping agent filled inside the tube. Even though the water-stopping agent is filled inside the tube, there is a slight increase of the outer diameter of a portion thereof to be water-stopped. Compared with a conventional water-stopping method of applying a water-stopping agent such as silicone to the drain wire or molding the drain wire with resin, the water-stopping construction of the present invention is capable of greatly making the portion to be water-stopped slim.

Further by covering the drain wire with the tube to form the drain wire as a pseudo coated electric wire, it is unnecessary to splice the drain wire and an ordinary electric wire with each other. Thereby it is possible to decrease the expenditure of component parts such as an electric wire, a terminal fitting, and the like and the processing expenditure.

By making the tube transparent, the water-stopping agent-filled state is visible from the outside. The shielded wire can be cut and stripped in a minimum length of 40 mm from the front end thereof. By decreasing the stripping length of the shielded wire, the shielded wire has an improved shielding performance.

Although silicone can be preferably used as the water-stopping agent, the water-stopping agent is not limited to the silicone. It is possible to use thermoplastic or thermosetting adhesive agents having a necessary flowability.

When the tube consists of a heat shrinkable tube, a boundary portion between a terminal connected to an end of the drain wire and the heat shrinkable tube is covered with a rubber stopper.

Because the drain wire is covered with the heat shrinkable tube and insulated, it is possible to effectively prevent the drain wire from being subjected to water. Further by mounting the rubber stopper on a terminal connection side of the heat shrinkable tube in which the water-stopping agent is filled, it is possible to completely prevent water from penetrating into the heat shrinkable tube from an end surface of the terminal connection side of the heat shrinkable tube. Therefore in the range from the end of the shielded wire to the terminal connection side, it is possible to completely prevent water from penetrating into the drain wire which is led out from the end of the shielded wire and has the terminal mounted on its front end by solderless connection.

When the tube consists of a rubber tube containing silicone or EPDM (ethylene-propylene rubber), a terminal connected to an end of the drain wire is connected to a peripheral surface of the rubber tube by solderless connection.

In the above-described construction, the tube covering the drain wire is made of a material similar to that of the rubber stopper, and the terminal is directly mounted on the tube by solderless connection. Therefore it is unnecessary to form the rubber stopper in the boundary portion between the terminal and the heat shrinkable tube. Thereby it is possible to decrease the number of parts and unnecessary to perform a rubber stopper-mounting work. Thereby it is possible to improve the workability.

The shielded wire is disposed in a waterproof region inside a vehicle; and both the terminal connected to the end of the drain wire and a terminal connected to an end of a coated electric wire led out from the shielded wire are connected to an appliance disposed inside the waterproof region.

For example, the terminal mounted on the end of the drain wire and the terminal connected to the end of the insulated coated electric wire serving as the core wire are inserted into and locked to a water-stopped connector, and the water-stopped connector is fitted in a connector fit-in portion of an ECU mounted in an engine room.

Thereby it is possible to prevent water from penetrating into the appliance through the drain wire and the appliance from malfunctioning.

The present invention provides a method for stopping water from penetrating into the drain wire.

A first method for stopping water from penetrating into the drain wire includes the steps of stripping a necessary length of a sheath of the shielded wire from a front end of the sheath, and leading out an insulated coated electric wire serving as a core electric wire and a drain wire in contact with a shielding material made of a metal braid or a metal foil; covering the drain wire led out with a heat shrinkable tube and heating the heat shrinkable tube to shrink the heat shrinkable tube or covering the drain wire led out with a rubber tube; and while sucking air from one end of the heat shrinkable tube or the rubber tube, supplying a water-stopping agent into the heat shrinkable tube or the rubber tube from other end thereof to fill the water-stopping agent between strands of the drain wire contained inside the tube.

In the first method, in filling the water-stopping agent into the tube, while the water-stopping agent is being supplied to the tube from an opening formed at one end of the tube, air is suck from an opening formed at the other end of the tube. Thereby it is possible to fill the water-stopping agent in the tube smoothly and without generating a gap.

More specifically, when the heat shrinkable tube is used, the drain wire is inserted through the heat shrinkable tube to form the drain wire as a pseudo electric wire, and with the rubber stopper mounted on the peripheral surface of the heat shrinkable tube, the terminal is mounted on the end of the drain wire to suck air from the one end of the tube, and the water-stopping agent is injected into the tube from the other end thereof.

A second method for stopping water from penetrating into a drain wire, including the steps of stripping a necessary length of a sheath of said shielded wire from a front end of said sheath, and leading out an insulated coated electric wire serving as a core electric wire and a drain wire in contact with a shielding material made of a metal braid or a metal foil; dripping or applying a water-stopping agent to said drain wire led out to penetrate said water-stopping agent between strands of said drain wire; and inserting said drain wire into which said water-stopping agent has penetrated through a heat shrinkable tube to cover said drain wire with said heat shrinkable tube and heating said heat shrinkable tube for shrinkage or inserting said drain wire into which said water-stopping agent has penetrated through a rubber tube to cover said drain wire with said rubber tube.

By applying the water-stopping agent to the drain wire along the surface thereof instead of adopting the method of dripping the water-stopping agent to the drain wire, it is possible to penetrate the applied water-stopping agent between the strands of the drain wire.

In the second method, the drain wire into which the water-stopping agent has penetrated is inserted through the heat shrinkable tube or the rubber tube. Thus unlike the first method, the second method eliminates the need for an operation of sucking air and the use of an air sucking means and is capable of shortening an operation period of time.

A third method for stopping water from penetrating into a drain wire, including the steps of stripping a necessary length of a sheath of the shielded wire from a front end of the sheath, and leading out an insulated coated electric wire serving as a core electric wire and a drain wire in contact with a shielding material made of a metal braid or a metal foil; and inserting the drain wire into a heat shrinkable tube having an obliquely cut portion or a slit portion formed by cut-out at a front end thereof, dripping a water-stopping agent to the obliquely cut portion or the slit portion and placing the water-stopping agent therein, and thereafter heating the heat shrinkable tube for shrinkage.

More specifically, after the shielded wire is covered with the heat shrinkable tube to the end thereof, the heat shrinkable tube is heated for shrinkage. After the heat shrinkable tube shrinks, the rubber stop is mounted on the peripheral surface thereof to form the drain wire as the pseudo electric wire. Thereafter the terminal is mounted on the end of the drain wire by solderless connection.

The third method for stopping water from penetrating into a drain wire, including the steps of stripping a necessary length of a sheath of the shielded wire from a front end of the sheath, and leading out an insulated coated electric wire serving as a core electric wire and a drain wire in contact with a shielding material made of a metal braid or a metal foil; and inserting the drain wire into a rubber tube having an obliquely cut portion or a slit portion formed by cut-out at a front end thereof, thereafter dripping a water-stopping agent to the obliquely cut portion or the slit portion and placing the water-stopping agent therein.

In the third method, it is preferable that after the drain wire is midway inserted into the heat shrinkable tube or the rubber tube, the water-stopping agent is dripped to and held in the obliquely cut portion or the slit portion and in this state, the heat shrinkable tube or the rubber tube is moved to a cut position (end of stripped portion) of the shielded wire.

In the third method, the heat shrinkable tube or the rubber tube has the obliquely cut portion or the slit portion formed at the front end thereof. Therefore by horizontally disposing the heat shrinkable tube or the rubber tube with the cut surface thereof or the slit-formed surface thereof located as the upper surface thereof, the dripped water-stopping agent can be received by the lower surface thereof confronting the cut surface thereof or the slit-formed surface thereof and can be penetrated between the strands of the drain wire.

Unlike the first method, the third method eliminates the need for sucking air, thus eliminating the use of an air sucking means and shortening an operation period of time. Furthermore because the water-stopping agent is dripped to the obliquely cut portion or the slit portion and held therein, it is possible to quantitatively manage the water-stopping agent. Further by covering the drain wire with the tube after the water-stopping agent is dripped to the tube, the water-stopping agent can be securely penetrated into the periphery of the drain wire.

In the third method, it is preferable that the shielded wire is disposed on a horizontal placing surface of a jig; the heat shrinkable tube or the rubber tube through which the drain wire has been inserted is disposed on an inclined surface inclined downward from a side edge of the horizontal placing surface of the jig; and the water-stopping agent is dripped to the obliquely cut portion or the slit portion of the heat shrinkable tube or the rubber tube disposed at an upper position of the inclined surface.

In the above-described construction, because the tube covering the drain wire is disposed on the inclined surface of the jig, the water-stopping agent which has dripped to the obliquely cut portion of the tube or the slit portion thereof flows along the slope and easily penetrates between the strands of the drain wire.

The inclination of the inclined surface of the jig is set to 30 to 90 degrees, favorably 30 to 80 degrees, and more favorably 45 to 80 degrees. This is because the larger the inclination is, the more favorable the water-stopping agent drips and thus the water-stopping performance can be improved. When the inclination is smaller than 30 degrees, the inclination is so gentle that it is difficult to penetrate the water-stopping agent between the strands of the drain wire by flowing it along the inclined surface. When the inclination is larger than 90 degrees, it is difficult for the obliquely cut portion to receive the water-stopping agent.

In the third method, when the heat shrinkable tube is used, it is preferable that the heat shrinkable tube where the water-stopping agent is dripped and filled is a non-waterproof heat shrinkable tube; a front end of the obliquely cut portion or the slit portion of the non-waterproof heat shrinkable tube is covered with one side of a waterproof heat shrinkable tube with other end of the waterproof heat shrinkable tube in contact with a cut position of the shielded wire; and the waterproof heat shrinkable tube and the non-waterproof heat shrinkable tube are simultaneously heated for shrinkage.

The waterproof heat shrinkable tube means a tube whose inner surface is provided with the water-stopping agent. The non-waterproof heat shrinkable tube means a tube whose inner surface is not provided with the water-stopping agent.

In the third method, when the heat shrinkable tube is used, it is preferable that a front end of the obliquely cut portion or the slit portion of the rubber tube is covered with one side of a waterproof heat shrinkable tube with other end of the waterproof heat shrinkable tube in contact with a cut position of the shielded wire; and the waterproof heat shrinkable tube is heated for shrinkage.

In the above-described construction, the drain wire led out from the shielded wire is covered with the non-waterproof heat shrinkable tube or the rubber tube to form the drain wire as the pseudo coated electric wire, and the non-waterproof heat shrinkable tube or the rubber tube is covered with the waterproof heat shrinkable tube in only the range from the obliquely cut portion or the slit portion thereof to the cut position of the shielded wire. Therefore the drain wire led out from the shielded wire does not have a very large diameter over the entire length thereof. The waterproof heat shrinkable tube is capable of enhancing the waterproof performance to a high extent at the obliquely cut portion and the slit portion and reinforces a portion of the drain wire led out from the cut position of the shielded wire. Thereby it is possible to prevent the drain wire from buckling when the drain wire is connected to a connector or the like.

There is provided a fourth method for stopping water from penetrating into a drain wire contained in a shielded wire, including the steps of stripping a necessary length of a sheath of the shielded wire from a front end of the sheath, and leading out an insulated coated electric wire serving as a core electric wire and a drain wire in contact with a shielding material made of a metal braid or a metal foil; inserting the drain wire led out through a heat shrinkable tube; heating one portion of the heat shrinkable tube surrounding a front side of the drain wire to shrink the heat, shrinkable tube without heating other portion of the heat shrinkable tube disposed at a side of the shielded wire opposite to the front side of the drain wire to form the other portion as a water-stopping agent-receiving portion with a gap held between the drain wire and the other portion of the heat shrinkable tube, and dripping a water-stopping agent to an opening of the water-stopping agent-receiving portion with an open side of the water-stopping agent-receiving portion located as an upper side of the heat shrinkable tube; and filling the dripped water-stopping agent throughout a whole length of the drain wire and the heat shrinkable tube, and thereafter heating the unheated side of the heat shrinkable tube for shrinkage.

It is preferable that the portion of the heat shrinkable tube to be initially heated for shrinkage has a length about ⅔ of the entire length thereof. This is because as the portion to be initially heated for shrinkage becomes long, the water-stopping agent penetrates into the strands of the drain wire not in its longitudinal direction, but between the strands of the drain wire sufficiently in the water-stopping agent-receiving portion. Thus the water-stopping method has an improved water-stopping performance. In this case, the water-stopping agent-receiving portion having about ⅓ of the entire length of the heat shrinkable tube has the shape of a deep saucer. By providing the heat shrinkable tube with the saucer-shaped water-stopping agent-receiving portion, the water-stopping agent-receiving portion is capable of receiving the water-stopping agent without overflowing it when a predetermined amount of the water-stopping agent which penetrates into the entire length of the drain wire is dripped from above.

In the fourth method, after the water-stopping agent-receiving portion is heated for shrinkage and thus the whole length of the heat shrinkable tube shrink to form the drain wire as the pseudo coated electric wire, the rubber stopper is mounted on the heat shrinkable tube by fitting the rubber stopper on the heat shrinkable tube. Thereafter the terminal is mounted at the front end of the drain wire by solderless connection. Thereafter the rubber stopper is moved between the terminal and the drain wire.

There is provided a fifth method for stopping water from penetrating into a drain wire contained in a shielded wire, including the steps of stripping a necessary length of a sheath of the shielded wire from a front end of the sheath, and leading out an insulated coated electric wire serving as a core electric wire and a drain wire in contact with a shielding material made of a metal braid or a metal foil; inserting the drain wire into a heat shrinkable tube having an opening formed by cutting out a necessary portion thereof and exposing the drain wire from the opening; dripping a water-stopping agent to the opening and placing the water-stopping agent therein, and in the state, heating the heat shrinkable tube for shrinkage; and covering the opening with a waterproof heat shrinkable tube and heating the waterproof heat shrinkable tube for shrinkage.

As the fifth method, there is also provided a method for stopping water from penetrating into a drain wire contained in a shielded wire, including the steps of stripping a necessary length of a sheath of the shielded wire from a front end of the sheath, and leading out an insulated coated electric wire serving as a core electric wire and a drain wire in contact with a shielding material made of a metal braid or a metal foil; inserting the drain wire into a rubber tube having an opening formed by cutting out a necessary portion thereof and exposing the drain wire from the opening; dripping a water-stopping agent to the opening and placing the water-stopping agent therein; and covering the opening with a waterproof heat shrinkable tube and heating the waterproof heat shrinkable tube for shrinkage.

In the fifth method, a necessary portion of the heat shrinkable tube or the rubber tube is cut out to form the opening. Therefore by disposing the heat shrinkable tube or the rubber tube horizontally with the opening thereof located as its upper side, the dripped water-stopping agent can be received at the opening, and the water-stopping agent can be penetrated between the strands of the drain wire.

Unlike the first method, the fifth method eliminates the need for the operation of sucking air, thus eliminating the use of an air sucking means and shortening an operation period of time. Further because the water-stopping agent is dripped to the opening and held therein, it is possible to quantitatively manage the water-stopping agent. In addition, by covering the drain wire with the waterproof heat shrinkable tube and heating it for shrinkage after the water-stopping agent is dripped to the heat shrinkable tube or the rubber tube, the water-stopping agent can be securely penetrated between the strands of the drain wire and into the periphery thereof.

There is provided a sixth method for stopping water from penetrating into a drain wire contained in a shielded wire, including the steps of stripping a necessary length of a sheath of the shielded wire from a front end of the sheath, cutting out a cut position of the shielded wire to form a slit, leading out an insulated coated electric wire serving as a core electric wire from the cut position, and leading out a drain wire in contact with a shielding material made of a metal braid or a metal foil; inserting the drain wire led out through a non-waterproof heat shrinkable tube and heating the non-waterproof heat shrinkable tube for shrinkage or inserting the drain wire led out through a rubber tube; dripping a water-stopping agent to the slit and placing the water-stopping agent therein; and heating a waterproof heat shrinkable tube whose one side covers an end portion of the non-waterproof heat shrinkable tube or the rubber tube at a side of the shielded wire and whose other side covers the slit of the sheath.

In the sixth method, the slit is formed at the cut position of the sheath. Thus by horizontally disposing the heat shrinkable tube with the slit located as the upper surface thereof, the dripped water-stopping agent can be received by the lower surface thereof confronting the slit and can be penetrated between the strands of the drain wire. In addition, after the water-stopping agent is dripped, the waterproof heat shrinkable tube covering the drain wire is heated for shrinkage. Therefore the water-stopping agent can be securely penetrated between the strands of the drain wire and into the periphery thereof.

Unlike the first method, the sixth method eliminates the need for the operation of sucking air, thus eliminating the use of an air sucking means and shortening an operation period of time. Furthermore because the water-stopping agent is dripped to the slit and held therein, it is possible to quantitatively manage the water-stopping agent.

It is preferable that the rubber tubes which are used in the first through third methods and the fifth and sixth methods are made of a material containing silicone or EPDM (ethylene-propylene rubber).

Effect of the Invention

As described above, in the present invention, the drain wire is covered with the heat shrinkable tube or the rubber tube, and the water-stopping agent is filled inside the heat shrinkable tube or the rubber tube. Therefore it is possible to accomplish the water-stopping processing by forming the drain wire as the pseudo coated electric wire and prevent a wire harness from becoming large by making the water-stopping processing portion slim.

Further unlike conventional water-stopping processing of splicing the insulated coated electric wire and the drain wire with each other and molding the spliced portion with silicone or the like, the present invention is capable of decreasing the number of work steps and the number of component parts. Further it is unnecessary to strip the shielded wire from the end thereof in the length (not less than 150 mm) required to perform the splicing processing, but a minimum length is sufficient for connecting the terminal to the end of the drain wire by solderless connection. Consequently it is possible to restrain the shielded wire from decreasing its shielding performance.

Figure 1:
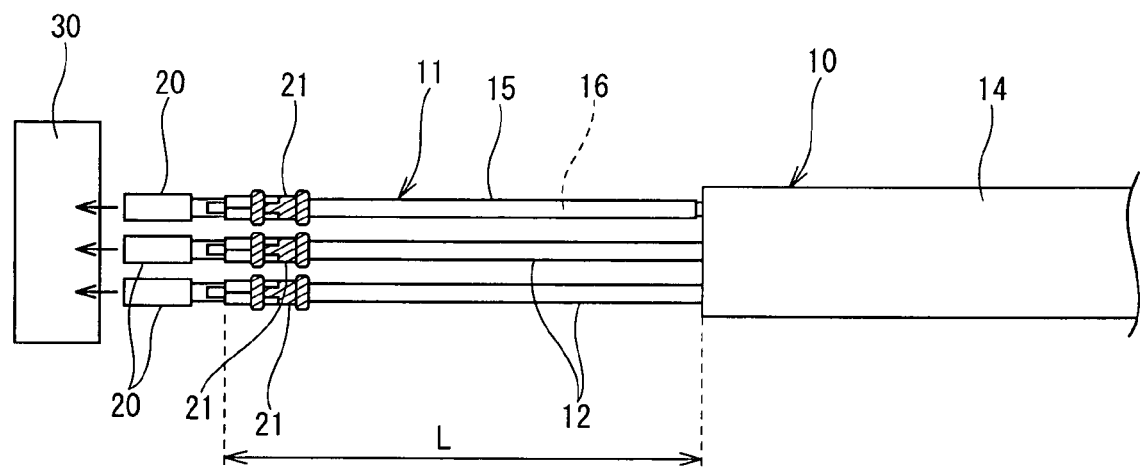
FIG. 1 shows an entire shielded wire in which water-stopping processing for a drain wire has been performed in a first embodiment of the present invention.

| Explanation of Reference Numerals and Symbols | |
|---|---|
| 10: | shielded wire |
| 11: | drain wire |
| 12: | insulated coated electric wire (core wire) |
| 13: | shielded layer |
| 14: | sheath |
| 15: | heat shrinkable tube |
| 16: | water-stopping agent (silicone) |
| 20: | terminal |
| 21: | rubber stopper |
| 40: | jig |
| 40a: | horizontal placing surface |
| 40b: | inclined surface |
| 50: | rubber tube |

BEST MODE FOR CARRYING OUT THE INVENTION

The embodiments of the present invention are described below with reference to the drawings.

FIG. 1 shows a shielded wire 10 of the first embodiment. The shielded wire 10 is disposed in a waterproof region of a car such as an engine room. An end of the shielded wire 10 is connected with a connector 30. The connector 30 is fitted in a connector accommodation portion of an ECU (not shown) disposed in the waterproof region.

Water-stopping processing is performed for a portion of a drain wire led out from a cut position of the stripped shielded wire 10.

Figure 2:
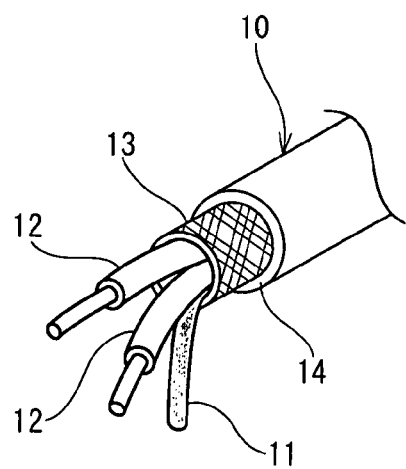
FIG. 2 is a perspective view of the shielded wire.

As shown in FIG. 2, the shielded wire 10 contains two insulated coated electric wires 12 (hereinafter referred to as core wire 12) constituting signal wires and a drain wire 11. The drain wire 11 and the core wires 12 are sequentially covered with a shielded layer 13 and a sheath 14. The drain wire 11 is brought into contact with the shielded layer 13 to electrically connect the drain wire 11 and the shielded layer 13 with each other.

The sheath 14 and the shielded layer 13 are cut and stripped in a minimum length L of about 40 mm from a front end of the shielded wire 10 to lead out the drain wire 11 and the core wire 12 from the shielded wire 10. Thereby terminals 20 which are to be inserted into and locked to the connector 30 are connected to a front end of each of the core wire 12 and the drain wire 11 by solderless connection.

Figure 3A:
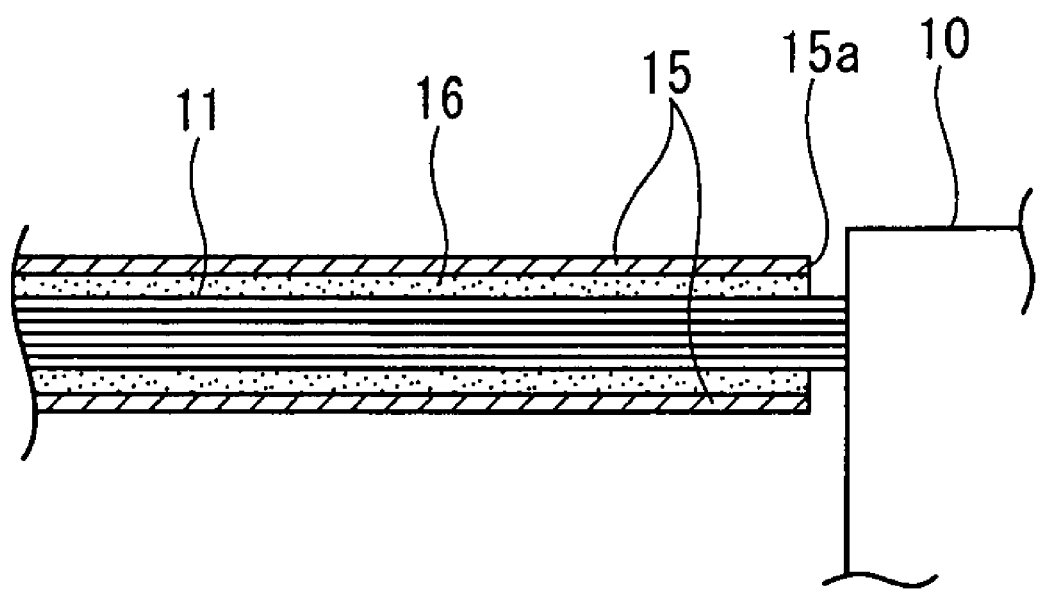
FIGS. 3(A) and 3(B) are enlarged sectional views of the drain wire for which water-stopping processing has been performed.
Figure 3B:
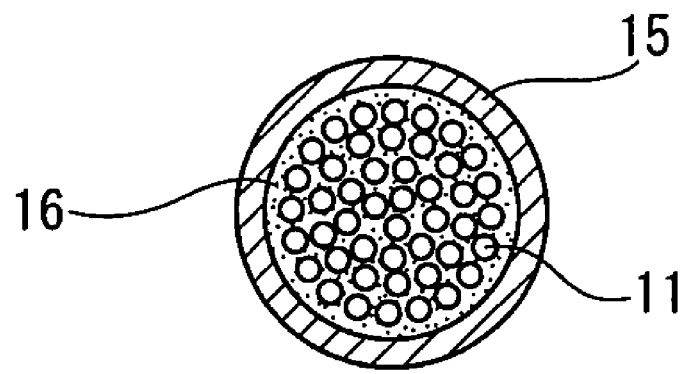

As shown in FIG. 3, water-stopping processing is performed by inserting the drain wire 11 led out from the end of the shielded wire 10 into a heat shrinkable tube 15 and filling a water-stopping agent 16 inside the heat shrinkable tube 15.

A rubber stopper 21 is mounted at a boundary portion between a front end of the heat shrinkable tube 15 and a portion of the drain wire 11 where the terminal 20 is mounted by solderless connection. The rubber stopper 21 is also mounted at a boundary portion between each of the core wires 12 and each terminal 20.

A first method for stopping the penetration of water into the drain wire 11 with which the above-described water-stopping construction is provided is described below.

Initially as described above, the sheath 14 and the shielded layer 13 made of a metal braid are cut in a minimum length L from the front end of the shielded wire 10 to strip the sheath 14 and the shielded layer 13 so that the core wire 12 and the drain wire 11 are exposed to the outside from a cut position of the shielded wire 10.

Figure 4A:
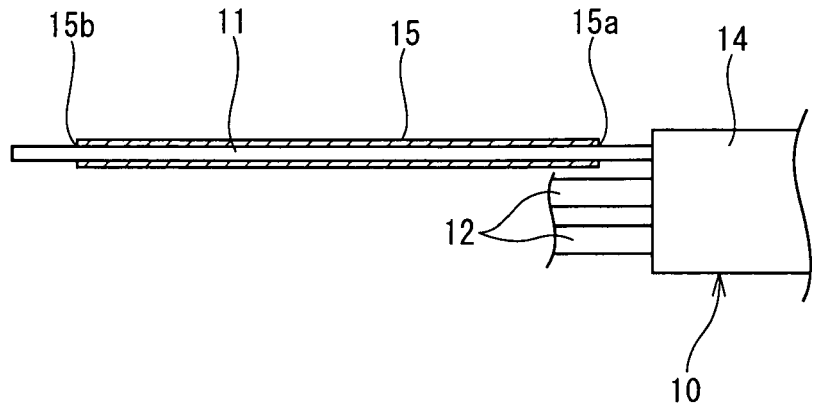
FIGS. 4(A), 4(B), and 4(C) show a first method for water-stopping the drain wire.

Thereafter as shown in FIG. 4(A), after the drain wire 11 is covered with the heat shrinkable tube 15 consisting of an insulating resin, the heat shrinkable tube 15 is heated to shrink it. Thereby the drain wire 11 is covered with the heat shrinkable tube 15, with the heat shrinkable tube 15 in close contact with almost the entire length of the periphery of the drain wire 11.

Figure 4B:
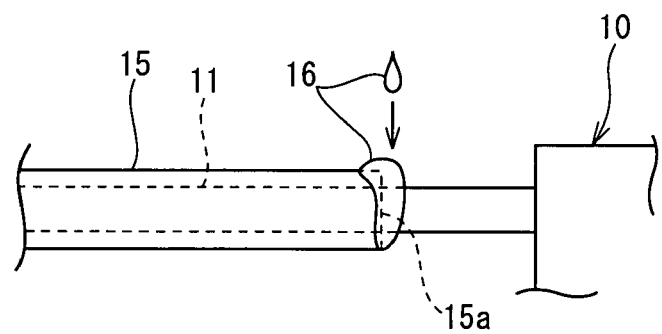
Figure 4C:
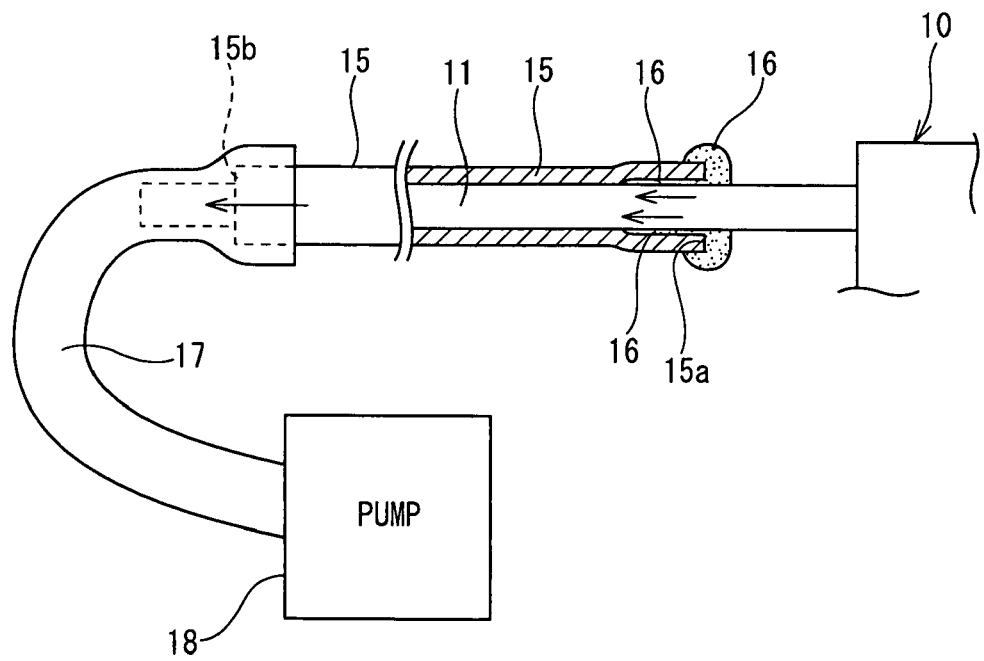

Thereafter as shown in FIG. 4(B), the water-stopping agent 16 consisting of silicone is dripped to the drain wire 11 exposed in a gap between a rear end of the heat shrinkable tube 15 and the cut position of the sheath 14 in such a way that an opening 15a at the rear end of the heat shrinkable tube 15 is closed. As shown in FIG. 4(C), simultaneously with the dripping or immediately after the dripping, a hose 17 is connected with the front end of the drain wire 11 with the hose 17 covering an opening 15b at the front end of the heat shrinkable tube 15, whereas the other end of the hose 17 is connected with a suction port of a suction pump 18. The suction pump 18 is driven to suck air inside the heat shrinkable tube 15 so that the pressure inside the heat shrinkable tube 15 is decreased.

Owing to the pressure decrease, the water-stopping agent 16 is sucked into the heat shrinkable tube 15 from the opening 15a disposed at the rear end thereof to penetrate the water-stopping agent 16 between strands of the drain wire 11 and is hardened with the passage of time.

After the water-stopping processing finishes, the rubber stopper 21 for water-stopping use is mounted on the drain wire 11 at the front end thereof, and the rubber stopper 21 is temporarily fixed to the peripheral surface of the front end of the heat shrinkable tube 15. In this state, the drain wire 11 is projected beyond the front end of the heat shrinkable tube 15 in a dimension necessary for mounting the terminal 20 on the projected portion of the front end of the drain wire 11 by solderless connection.

After the terminal 20 is mounted at the front end of the drain wire 11 by solderless connection, the rubber stopper 21 is moved to a position where the rubber stopper 21 covers the terminal 20. In this state, the other side of the rubber stopper 21 is located as a position where the rubber stopper 21 covers the peripheral surface of the front side of the heat shrinkable tube 15, thus covering the boundary portion between the portion of the drain wire 11 where the terminal is mounted by solderless connection and the heat shrinkable tube 15.

The other end of the heat shrinkable tube 15 is positioned at the cut position of the shielded wire 10. The heat shrinkable tube 15 completely covers the drain wire 11 to form the drain wire 11 as a pseudo coated electric wire.

Even though there is a slight gap between the rear end of the heat shrinkable tube 15 and the end of the shielded wire 10, as described above, the water-stopping agent 16 is supplied to the gap to cover the surface of the rear end of the heat shrinkable tube 15 and the front end of the shielded wire 10 with the water-stopping agent 16 in a molded state. Thus it is possible to prevent water from penetrating into the drain wire 11 from the gap.

As shown in FIG. 1, the terminal 20 is mounted at the front end of each of the two core wires 12 by solderless connection, and in a method similar to that carried out for the drain wire 11, the rubber stopper 21 is mounted at the front end of each of the two core wires 12.

As described above, the water-stopping processing is performed by covering the drain wire 11 projected in exposure beyond the sheath 14 of the shielded wire 10 with the heat shrinkable tube 15 and filling the water-stopping agent 16 consisting of the silicone in the heat shrinkable tube 15.

Therefore even though water penetrates into the heat shrinkable tube 15 from openings disposed at both ends thereof, the penetration of the water can be prevented by the water-stopping agent 16 filled inside the heat shrinkable tube 15. As described above, even though there is a gap between the rear end of the heat shrinkable tube 15 and the end of the shielded wire 10 and the drain wire 11 is exposed to the outside, it is possible to prevent the water from penetrating between into the drain wire 11 because the drain wire 11 is molded with the water-stopping agent consisting of the silicone.

Because the boundary portion between the front end of the heat shrinkable tube 15 and the terminal 20 is covered with the rubber stopper 21, it is possible to prevent the penetration of the water into the heat shrinkable tube 15 from the front end thereof.

Further there is provided a water-stopping construction of sucking air inside the heat shrinkable tube 15 to fill the water-stopping agent 16 between the strands of the drain wire 11. Thus a portion to be water-stopped does not have a large diameter and is allowed to be smaller than a conventional portion to be water-stopped.

Further by covering the drain wire 11 with the heat shrinkable tube 15 to form the drain wire 11 as the pseudo electric wire, it is unnecessary to splice the drain wire 11 and the insulated coated electric wire with each other. Therefore it is possible to decrease a material cost and a processing expenditure and set the stripping length L of the sheath of the shielded wire 10 to 40 mm which is the length necessary for mounting the terminal on the drain wire 11 by solderless connection. By minimizing the stripping length L, it is possible to greatly restrain the shielded wire 10 from deteriorating in the shielding performance thereof.

Figure 5:
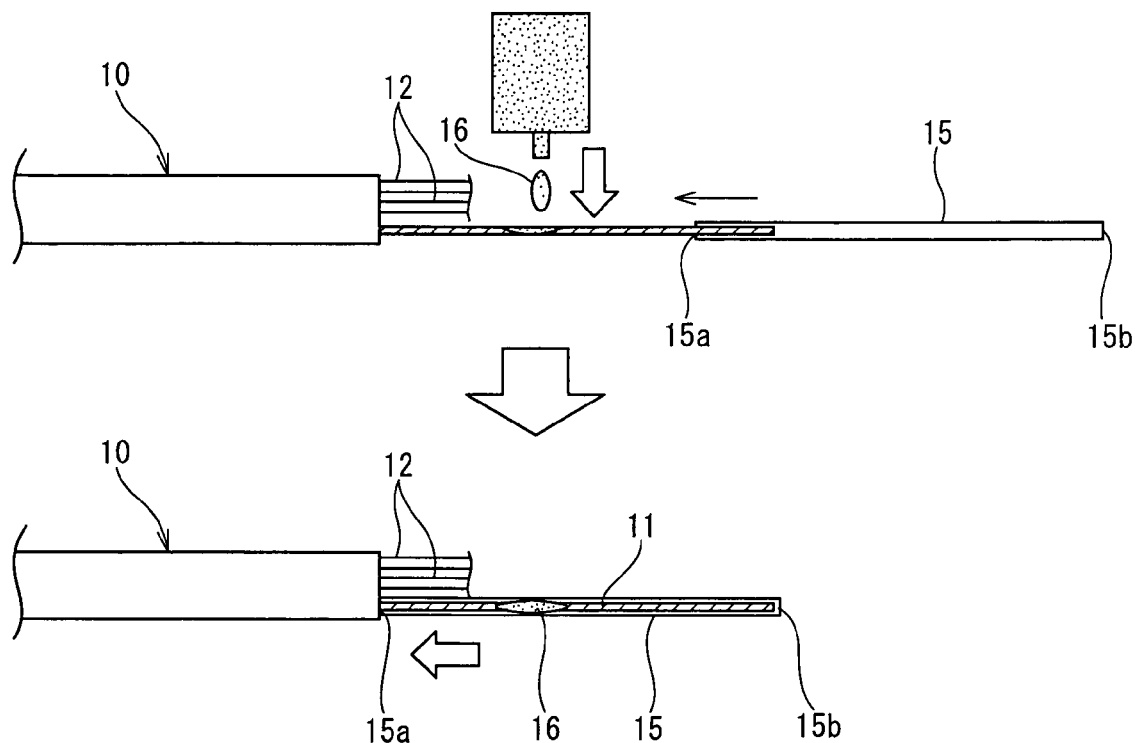
FIG. 5 shows a second method for water-stopping the drain wire.

FIG. 5 shows a second method for stopping the penetration of water into the drain wire 11.

In the second method, before the drain wire 11 exposed to the outside from the cut position of the shielded wire 10 is covered with the heat shrinkable tube 15, the water-stopping agent (silicone) 16 is dripped from above to an intermediate position of the drain wire 11 in its longitudinal direction. The dripped water-stopping agent 16 can be penetrated between the strands of the drain wire 11 owing to its flowability. In this manner, the water-stopping agent 16 can be penetrated into the strands of the exposed drain wire 11 over the whole length thereof. The state of the penetration of the water-stopping agent 16 into the strands of the drain wire 11 can be inspected visually because the drain wire 11 is not covered with the heat shrinkable tube 15.

Thereafter the drain wire 11 is covered with the heat shrinkable tube 15 from the front end thereof. After the drain wire 11 is covered with the heat shrinkable tube 15 over the whole length thereof from the front end thereof to the cut position of the shielded wire 10, the heat shrinkable tube 15 is heated to shrink it. Thereafter the heat shrinkable tube 15 is brought into close contact with the peripheral surface of the drain wire 11 in which the water-stopping agent has penetrated between the strands.

At subsequent steps similar to the first method, the rubber stopper is mounted at the predetermined portion, and the terminal is mounted at the front end of the drain wire 11 by solderless connection.

The drain wire 11 for which the water-stopping processing has been performed by the second method is similar to that for which the water-stopping processing has been performed by the first method and has a construction, shown in FIGS. 1 through 3, which allows a slim portion to be water-stopped to be formed on the drain wire 11. Thus the second method has the same operation and effect as those of the first method.

Instead of dripping the water-stopping agent 16 to the drain wire 11 at the intermediate portion thereof, the water-stopping agent 16 may be applied thereto along the peripheral surface thereof.

Figure 6:
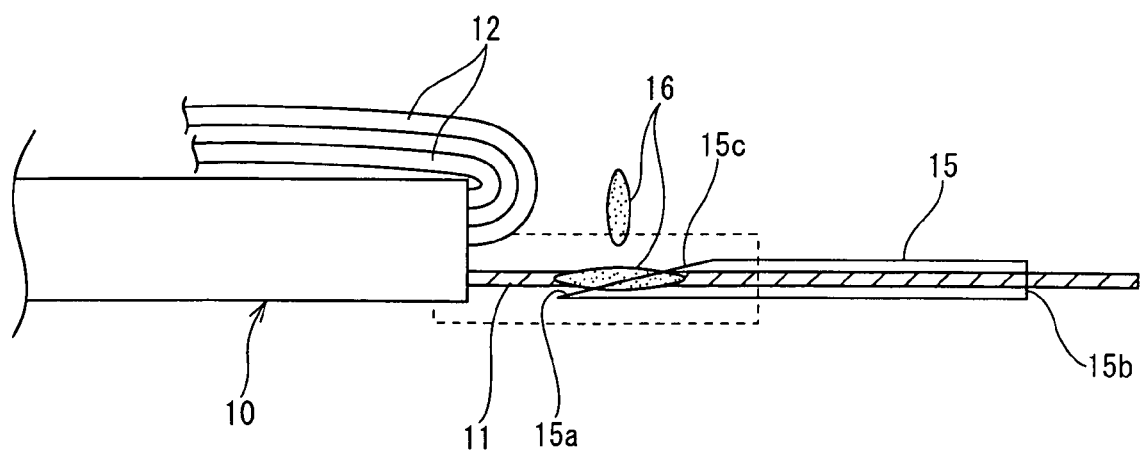
FIG. 6 shows a third method for water-stopping the drain wire.

FIG. 6 shows a third method for stopping the penetration of water into the drain wire.

In the third method, a water-stopping agent-receiving portion 15c is formed by obliquely cutting the heat shrinkable tube 15 at the front end of the heat shrinkable tube 15 covering the shielded wire 10. The front end of the heat shrinkable tube 15 is disposed at the cut position of the shielded wire 10.

The drain wire 11 is covered with the heat shrinkable tube 15 from the water-stopping agent-receiving portion 15c formed by obliquely cutting the heat shrinkable tube 15. The movement of the heat shrinkable tube 15 is stopped at a midway position before the water-stopping agent-receiving portion 15c disposed at the front end of the heat shrinkable tube 15 reaches the cut position. Thereafter the water-stopping agent 16 made of silicone is dripped from above and received by the water-stopping agent-receiving portion 15c held horizontally with a cut side thereof located as its upper side. The dripped water-stopping agent penetrates into the front end of the drain wire 11 covered with the heat shrinkable tube 15.

After a predetermined amount of the water-stopping agent 16 is dripped, the heat shrinkable tube 15 is moved to the cut position of the shielded wire 10 with the drain wire 11 covered with the heat shrinkable tube 15. At this time, the peripheral surface of the drain wire 11 being inserted into the heat shrinkable tube 15 contacts the water-stopping agent 16 held by the water-stopping agent-receiving portion 15c, with the water-stopping agent 16 penetrating between the strands of the drain wire 11.

In the above-described step, the operation of inserting the drain wire 11 through the heat shrinkable tube 15 and the operation of penetrating the water-stopping agent 16 between the strands of the drain wire 11 are simultaneously performed. When the drain wire 11 is covered with the heat shrinkable tube 15 to the cut position of the shielded wire 10, the water-stopping agent 16 penetrates between the strands of the drain wire 11 over the whole length thereof.

Thereafter the heat shrinkable tube 15 is heated to shrink it and brought into close contact with the peripheral surface of the drain wire 11 in which the water-stopping agent 16 has penetrated between the strands.

Similarly to the first and second methods, after the rubber stopper 21 is mounted on the drain wire 11, the terminal 20 is mounted on the end of the drain wire 11 projected beyond the front end of the heat shrinkable tube 15 by solderless connection. After the solderless connection of the terminal finishes, the rubber stopper 21 is moved to a boundary position between the terminal and the heat shrinkable tube 15 to cover the boundary position with the rubber stopper 21.

The drain wire 11 for which the water-stopping processing has been performed by the third method is similar to that for which the water-stopping processing has been performed by the first and second methods and has a construction, shown in FIGS. 1 through 3, which allows a slim portion to be water-stopped to be formed on the drain wire 11. Thus the third method has the same operation and effect as those of the first and second methods.

Further, similarly to the second method, it is unnecessary to suck air at the time of the filling of the water-stopping agent and thus it is possible to decrease an operation period of time. Furthermore because the dripped water-stopping agent is received by the water-stopping agent-receiving portion formed by obliquely cutting the heat shrinkable tube 15, the dripped water-stopping agent does not drop, and the amount of the dripped water-stopping agent can be restricted to an amount which can be received by the water-stopping agent-receiving portion 15c. That is, by adjusting a dimension of the water-stopping agent-receiving portion to be formed by obliquely cutting the heat shrinkable tube 15, it is possible to quantitatively manage the water-stopping agent.

Figure 7A:
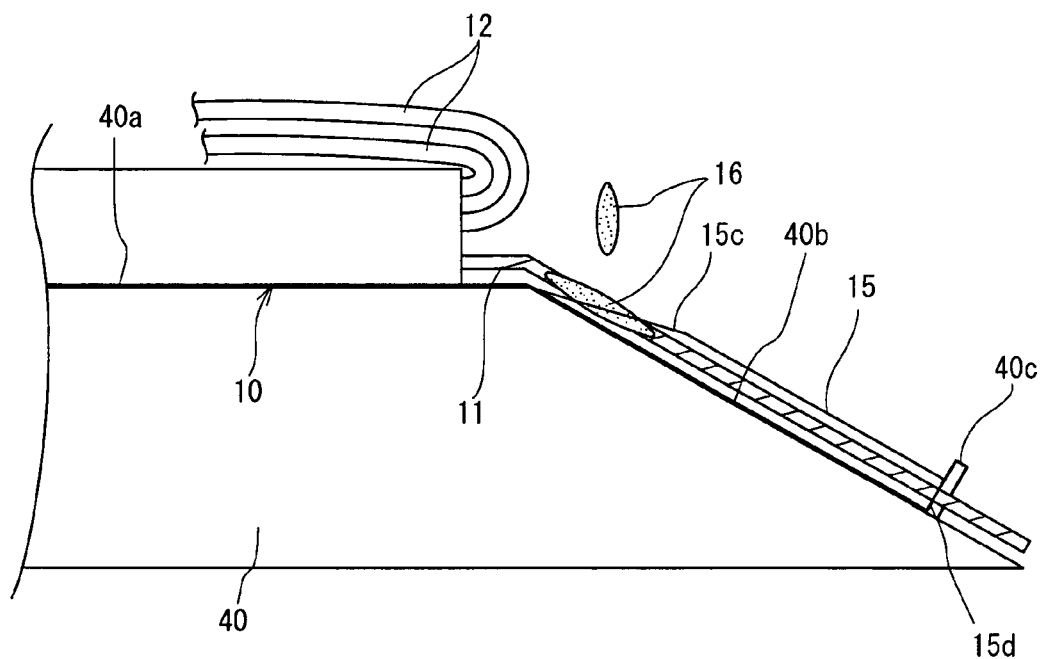
FIGS. 7(A) and 7(B) show a first modification example of the third method for water-stopping the drain wire.
Figure 7B:
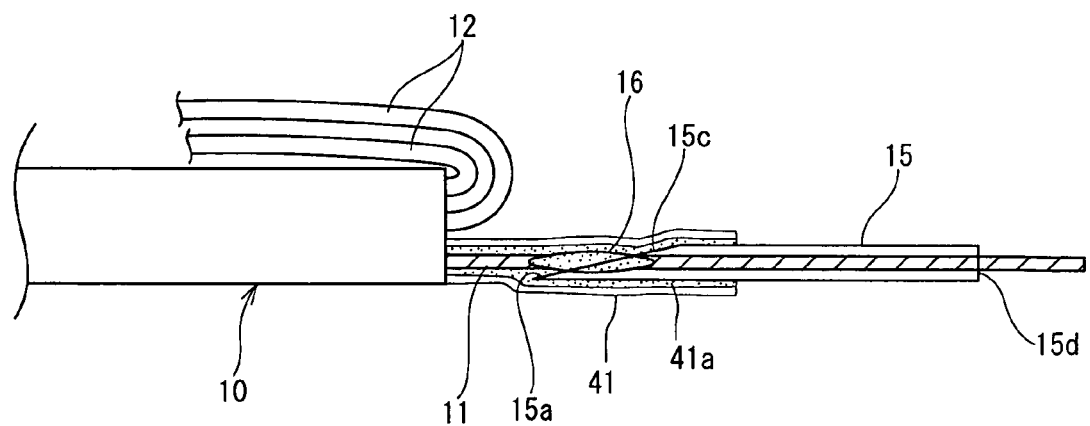

FIG. 7 shows a first modification example of the third method for stopping the penetration of water into the drain wire.

In the first modification example of the third method, a jig 40 having a horizontal placing surface 40a and an inclined surface 40b inclined downward from a side edge of the horizontal placing surface 40a is used. The inclination of the inclined surface 40b is set to 45 degrees to a horizontal surface. At a lower position of the inclined surface 40b, there is provided a holding plate 40c for holding the heat shrinkable tube 15 on the inclined surface 40b with the holding plate 40c in contact with an end 15d of the heat shrinkable tube 15 disposed at a side opposite to the position of the water-stopping agent-receiving portion 15c.

The shielded wire 10 is disposed on the horizontal placing surface 40a of the jig 40. The heat shrinkable tube 15 covering the drain wire 11 is disposed on the inclined surface 40b by holding the heat shrinkable tube 15 by the holding plate 40c with the water-stopping agent-receiving portion 15c of the heat shrinkable tube 15, formed by obliquely cutting the heat shrinkable tube 15, located at a higher position of the inclined surface 40b. At this time, the cut side of the water-stopping agent-receiving portion 15c is located as the upper side thereof. The heat shrinkable tube 15 has the same configuration as that used in the third method and consists of a non-waterproof heat shrinkable tube whose inner surface is not provided with the water-stopping agent.

The water-stopping agent 16 is dripped from above to the water-stopping agent-receiving portion 15c of the heat shrinkable tube 15 disposed on the inclined surface 40b of the jig 40 and received by the water-stopping agent-receiving portion 15c. Along the inclined surface 40b, the dripped water-stopping agent penetrates into the front end of the drain wire 11 covered with the heat shrinkable tube 15.

After a predetermined amount of the water-stopping agent 16 is dripped, the heat shrinkable tube 15 is moved to the cut position of the shielded wire 10 with the drain wire 11 covered with the heat shrinkable tube 15. At this time, the peripheral surface of the drain wire 11 being gradually inserted into the heat shrinkable tube 15 contacts the water-stopping agent 16 held by the water-stopping agent-receiving portion 15c, with the water-stopping agent 16 penetrating between the strands of the drain wire 11.

Thereafter the shielded wire 10 is removed from the jig 40. In a range from the water-stopping agent-receiving portion 15c of the heat shrinkable tube 15 to the cut position of the shielded wire 10, the heat shrinkable tube 15 is covered with a waterproof heat shrinkable tube 41 whose inner surface is provided with a water-stopping agent 41a. That is, one side of the waterproof heat shrinkable tube 41 covers the water-stopping agent-receiving portion 15c of the heat shrinkable tube 15, whereas the other side of the waterproof heat shrinkable tube 41 is in contact with the cut position of the shielded wire 10. In this state, the heat shrinkable tube 15 and the waterproof heat shrinkable tube 41 are heated to shrink them so that the heat shrinkable tube 15 and the waterproof heat shrinkable tube 41 closely contact the peripheral surface of the drain wire 11.

Similarly to the first and second methods, after the rubber stopper 21 is mounted on the drain wire 11, the terminal 20 is mounted on the end of the drain wire 11 projected beyond the front end of the heat shrinkable tube 15 by solderless connection.

The drain wire 11 for which the water-stopping processing has been performed by the first modification example of the third method is similar to that for which the water-stopping processing has been performed by the third method and has a construction which allows a slim portion to be water-stopped to be formed on the drain wire 11. Thus the first modification example of the third method has the same operation and effect as those of the third method.

Because the heat shrinkable tube 15 covering the drain wire 11 is disposed on the inclined surface 40b of the jig 40, the water-stopping agent 16 which has dripped to the water-stopping agent-receiving portion 15c of the heat shrinkable tube 15 flows along the slope and easily penetrates between the strands of the drain wire 11.

Other methods and operations and effects of the first modification example of the third method are similar to those of the third method. Thus the same parts of the first modification example as those of the third method are denoted by the same reference numerals as those of the third method, and description thereof is omitted herein.

Figure 8A:
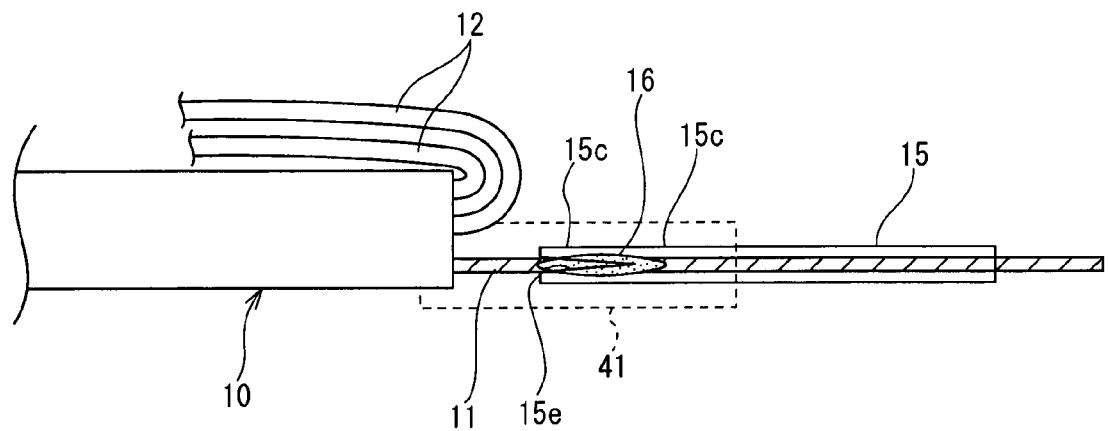
FIGS. 8(A) and 8(B) show a second modification example of the third method for water-stopping the drain wire.
Figure 8B:
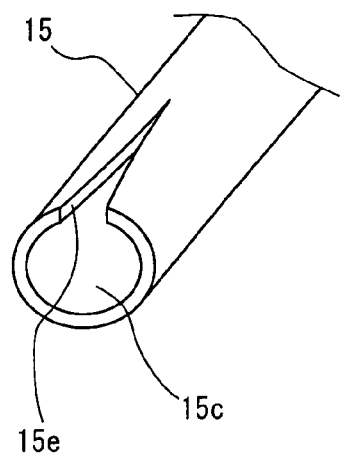

FIG. 8 shows a second modification example of the third method for stopping the penetration of water into the drain wire.

In the method of the second modification example, at the front end of the heat shrinkable tube 15 disposed at the cut position of the shielded wire 10, there is formed the water-stopping agent-receiving portion 15c having a triangular slit 15e extended in a longitudinal direction of the heat shrinkable tube 15 covering the shielded wire 10.

The drain wire 11 is covered with the heat shrinkable tube 15 from the water-stopping agent-receiving portion 15c having the slit formed therethrough. The movement of the heat shrinkable tube 15 is stopped at a midway position before the water-stopping agent-receiving portion 15c reaches the cut position. Thereafter the water-stopping agent-receiving portion 15c disposed at the front end of the heat shrinkable tube 15 is held horizontally with the slit 15e located as the upper side thereof. In this state, the water-stopping agent 16 is dripped from above and received by the water-stopping agent-receiving portion 15c. The dripped water-stopping agent penetrates into the front end of the drain wire 11 covered with the heat shrinkable tube 15.

After a predetermined amount of the water-stopping agent 16 is dripped, the heat shrinkable tube 15 is moved to the cut position of the shielded wire 10 with the drain wire 11 covered with the heat shrinkable tube 15. At this time, the peripheral surface of the drain wire 11 being gradually inserted into the heat shrinkable tube 15 contacts the water-stopping agent 16 held by the water-stopping agent-receiving portion 15c, with the water-stopping agent 16 penetrating between the strands of the drain wire 11.

In the above-described step, the operation of inserting the drain wire 11 through the heat shrinkable tube 15 and the operation of penetrating the water-stopping agent 16 between the strands of the drain wire 11 are simultaneously performed. When the drain wire 11 is covered with the heat shrinkable tube 15 to the cut position of the shielded wire 10, the water-stopping agent 16 penetrates between the strands of the drain wire 11 over the whole length thereof.

Thereafter in the range from the water-stopping agent-receiving portion 15c of the heat shrinkable tube 15 to the cut position of the shielded wire 10, the heat shrinkable tube 15 is covered with the waterproof heat shrinkable tube 41 whose inner surface is provided with the water-stopping agent 41a. That is, one side of the waterproof heat shrinkable tube 41 covers the entire slit 15e of the heat shrinkable tube 15, whereas the other end thereof is in contact with the cut position of the shielded wire 10. In this state, the heat shrinkable tube 15 and the waterproof heat shrinkable tube 41 are heated to shrink them so that the heat shrinkable tube 15 and the waterproof heat shrinkable tube 41 closely contact the peripheral surface of the drain wire 11.

In a method similar to that of the first and second methods, after the rubber stopper 21 is mounted on the drain wire 11, the terminal 20 is mounted on the end of the drain wire 11 projected beyond the front end of the heat shrinkable tube 15 by solderless connection.

The drain wire 11 for which the water-stopping processing has been performed by the second modification example of the third method is similar to that for which the water-stopping processing has been performed by the third method and has a construction which allows a slim portion to be water-stopped to be formed on the drain wire 11. The second modification example of the third method has the same operation and effect as those of the third method.

Because the slit 15e is formed at the front end of the heat shrinkable tube 15 at the drain wire insertion side thereof, the drain wire 11 can be easily inserted into the heat shrinkable tube 15.

Other methods and operations and effects of the second modification example of the third method are similar to those of the third method. Thus the same parts of the second modification example as those of the third method are denoted by the same reference numerals as those of the third method, and description thereof is omitted herein.

In the third method, after the heat shrinkable tube 15 covers the drain wire 11 halfway and the water-stopping agent 16 is dripped, the heat shrinkable tube 15 is moved to the cut position of the shielded wire 10. But it is possible to adopt a method of moving the heat shrinkable tube 15 to a predetermined position and not moving the heat shrinkable, tube 15 after the water-stopping agent 16 is dripped.

Figure 9A:
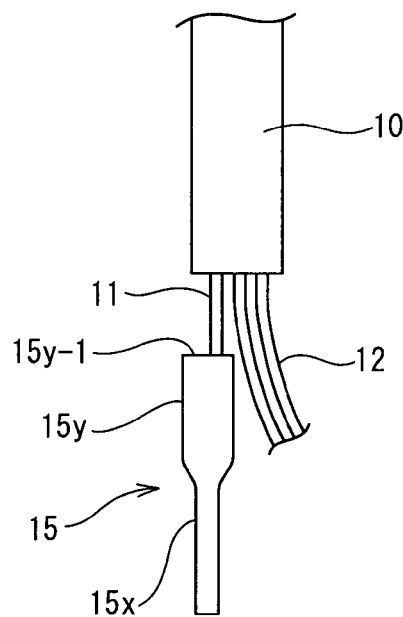
FIGS. 9(A), 9(B), and 9(C) show a fourth method for water-stopping the drain wire.
Figure 9B:
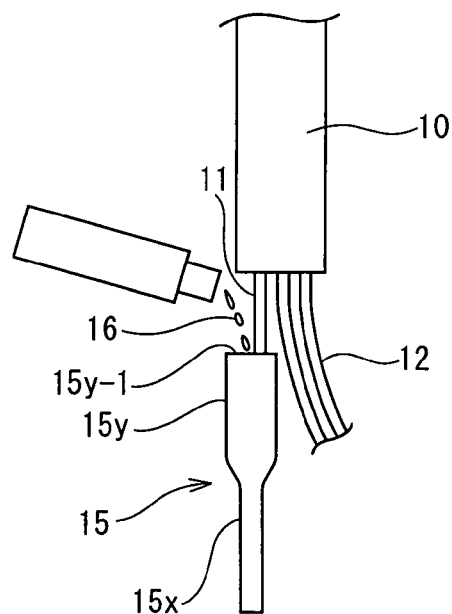
Figure 9C:
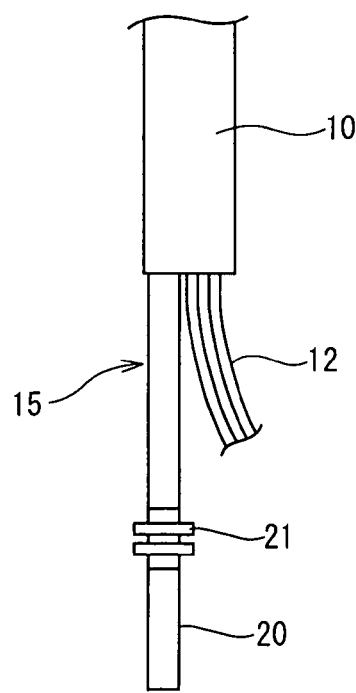

FIG. 9 shows a fourth method for stopping the penetration of water into the drain wire.

Initially the drain wire 11 led out from the cut position of the shielded wire 10 is covered with the heat shrinkable tube 15 from the front end of the drain wire 11.

A portion 15x having a length about the half of the length of the heat shrinkable tube 15 from the front end thereof disposed at the side of the drain wire 11 is heated to shrink the portion 15x and brought into close contact with the peripheral surface of the drain wire 11. In this state, as shown in FIG. 9(A), the remaining half of the heat shrinkable tube 15, disposed at the side of the cut position, which has not been heated for shrinkage has a gap between the remaining half of the heat shrinkable tube 15 and the peripheral surface of the drain wire 11. The side of the heat shrinkable tube 15 confronting the cut position is formed as an open end of the heat shrinkable tube 15 having the gap. That is, the remaining half of the length of the heat shrinkable tube 15 has the shape of a deep dish and is denoted as a water-stopping agent-receiving portion 15y.

Thereafter the heat shrinkable tube 15 is disposed vertically with the open end 15y-1 of the water-stopping agent-receiving portion 15y disposed uppermost. As shown in FIG. 9(B), with the uppermost disposed open end 15y-1 spaced at a certain interval from the cut position disposed above the open end 15y-1, the water-stopping agent 16 is dripped from above.

The dripped water-stopping agent 16 drops into the portion 15x which has been heated for shrinkage by gravity and penetrates between the strands of the drain wire 11 inserted into the portion 15x. In addition, the dripped water-stopping agent 16 also penetrates between the strands of a portion of the drain wire 11 inserted into the water-stopping agent-receiving portion 15y. By dripping a predetermined amount of the water-stopping agent 16 into the water-stopping agent-receiving portion 15y, the water-stopping agent 16 penetrates between the strands of the drain wire 11 over the whole length thereof.

After the predetermined amount of the water-stopping agent 16 is dripped, the open end 15y-1 of the heat shrinkable tube 15 is lifted to bring the open end 15y-1 into contact with the cut position of the shielded wire 10 so that the water-stopping agent 16 penetrates between the strands of the drain wire 11 over the whole the length thereof.

Thereafter the water-stopping agent-receiving portion 15y which has not been heated is heated to shrink it and brought into close contact with the peripheral surface of the drain wire 11.

Similarly to the first and second methods, after the rubber stopper 21 is mounted on the drain wire 11, the terminal 20 is mounted on the end of the drain wire 11 projected beyond the front end of the heat shrinkable tube 15 by solderless connection. After the solderless connection of the terminal 20 finishes, the rubber stopper 21 is moved to the boundary position between the terminal 20 and the heat shrinkable tube 15 so that the rubber stopper 21 covers the boundary position.

Similarly to the drain wire 11 for which the water-stopping processing has been performed by the first and second methods, the drain wire 11 for which the water-stopping processing has been performed by the fourth method has a construction, shown in FIGS. 1 through 3, which allows a slim portion to be water-stopped to be formed on the drain wire 11. Thus the fourth method has the same operation and effect as those of the first and second methods.

Further unlike in the third method, in the fourth method, the water-stopping agent-receiving portion can be formed without obliquely cutting the heat shrinkable tube. In addition, because the water-stopping agent-receiving portion has the shape of a deep dish, the water-stopping agent-receiving portion is capable of securely receiving the water-stopping agent dripped from above without overflowing the water-stopping agent. Furthermore by appropriately adjusting the length of the front side of the heat shrinkable tube to be heated for shrinkage and the length of the water-stopping agent-receiving portion thereof not heated, it is possible to manage the amount of the water-stopping agent to be dripped.

In the fourth method, the portion of the heat shrinkable tube having a length about the half of the length of the heat shrinkable tube 15 is heated for shrinkage, and the portion having about the remaining half of the length thereof is formed as the water-stopping agent-receiving portion. But even though the portion of the heat shrinkable tube having a length about ⅔ of the length thereof is heated for shrinkage and even though the portion having a length about ⅓ of the length thereof is formed as the water-stopping agent-receiving portion, it is possible to form a preferable portion to be water-stopped.

In the fourth method, the portion to be water-stopped is formed by setting the longitudinal direction of the heat shrinkable tube 15 to a vertical direction. But the portion to be water-stopped may be formed by carrying out the fourth method in a state where the heat shrinkable tube 15 is placed on the inclined surface 40*b* of the jig 40 used in the first modification of the third method.

FIG. 10 shows a fifth method for stopping the penetration of water into the drain wire 11.

In the fifth method, the heat shrinkable tube 15 which covers the drain wire 11 is cut out at a midway position to form an opening 15*d*.

Figure 10A:
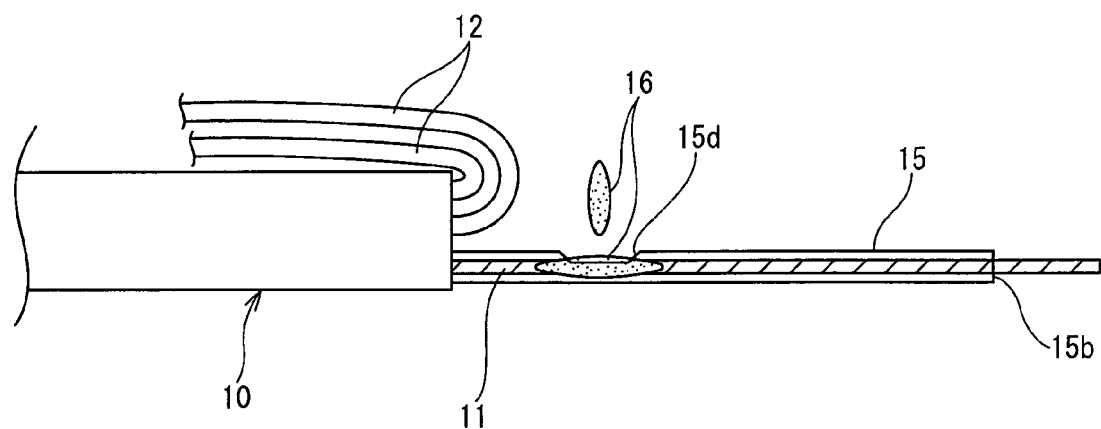
FIGS. 10(A) and 10(B) show a fifth method for water-stopping the drain wire.

As shown in FIG. 10(A), the heat shrinkable tube 15 is moved to cover the drain wire 11 till the heat shrinkable tube 15 reaches the cut position. The water-stopping agent 16 made of silicone is dripped from above to the opening 15*d* disposed at the upper side of the heat shrinkable tube 15 held horizontally and received by the periphery of the opening 15*d* and a portion of the heat shrinkable tube 15 confronting the opening 15*d*. The dripped water-stopping agent 16 penetrates between the strands of the drain wire 11 covered with the heat shrinkable tube 15.

After the predetermined amount of the water-stopping agent 16 is dripped, the heat shrinkable tube 15 is heated to shrink it and brought into close contact with the peripheral surface of the drain wire 11 in which the water-stopping agent 16 has penetrated between the strands.

Figure 10B:
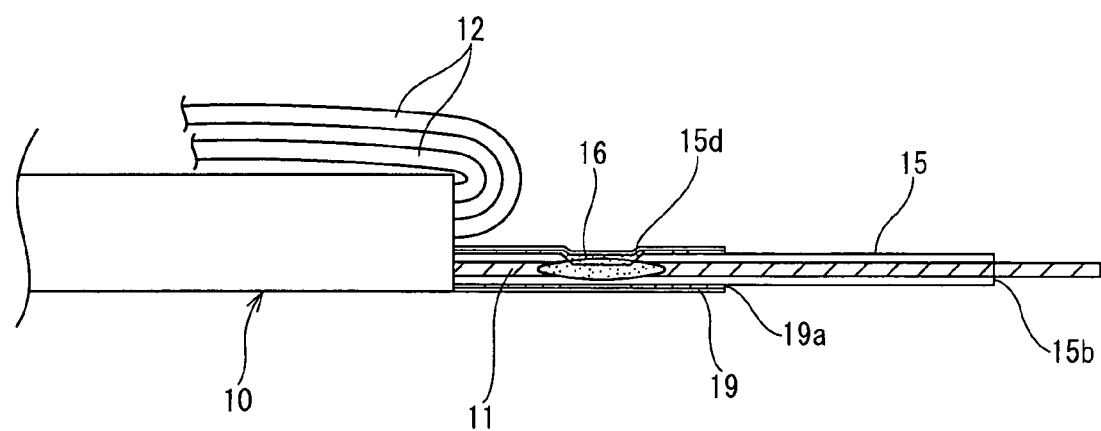

As shown in FIG. 10(B), after the heat shrinkable tube 15 is covered with a waterproof heat shrinkable tube 19 to cover the entire surface of the opening 15*d* of the heat shrinkable tube 15, the waterproof heat shrinkable tube 19 is heated for shrinkage. At this time, the opening 15*d* is covered with a water-stopping agent 19*a* provided on the inner peripheral surface of the waterproof heat shrinkable tube 19, and the water-stopping agent 15 is filled between the peripheral surface of the heat shrinkable tube 15 and the inner peripheral surface of the waterproof heat shrinkable tube 19.

In a method similar to that of the second method, after the rubber stopper 21 is mounted on the predetermined position, the terminal 20 is mounted on the end of the drain wire 11 projected beyond the front end of the heat shrinkable tube 15 by solderless connection.

The drain wire 11 waterproofed by the fifth method has a little larger diameter than the drain wire waterproofed by the above-described methods by the thickness of the waterproof heat shrinkable tube 19 mounted on the heat shrinkable tube 15. But owing to the use of the waterproof heat shrinkable tube 19, it is possible to securely prevent the penetration of water into the heat shrinkable tube 15 for which water-stopping processing has been performed from the opening 15*d* and in addition keep the terminal connected to the front end of the drain wire straight in inserting the terminal into a connector to connect the terminal to a mating terminal. Therefore a connector connection work can be facilitated.

Similarly to the second method, at the time of the filling of the water-stopping agent, it is unnecessary to suck air and thus it is possible to decrease an operation period of time. Further because the dripped water-stopping agent is received by the periphery of the opening of the heat shrinkable tube, the dripped water-stopping agent does not drop, and the amount of the dripped water-stopping agent can be restricted to the amount which can be received by the periphery of the opening.

In the fifth method, the waterproof heat shrinkable tube 19 is directly mounted on the opening 15*d* of the heat shrinkable tube 15. But the waterproof heat shrinkable tube 19 may be mounted on the opening 15*d* of the heat shrinkable tube 15, after a tape is wound around the opening 15*d* to prevent the water-stopping agent from overflowing.

Figure 11:
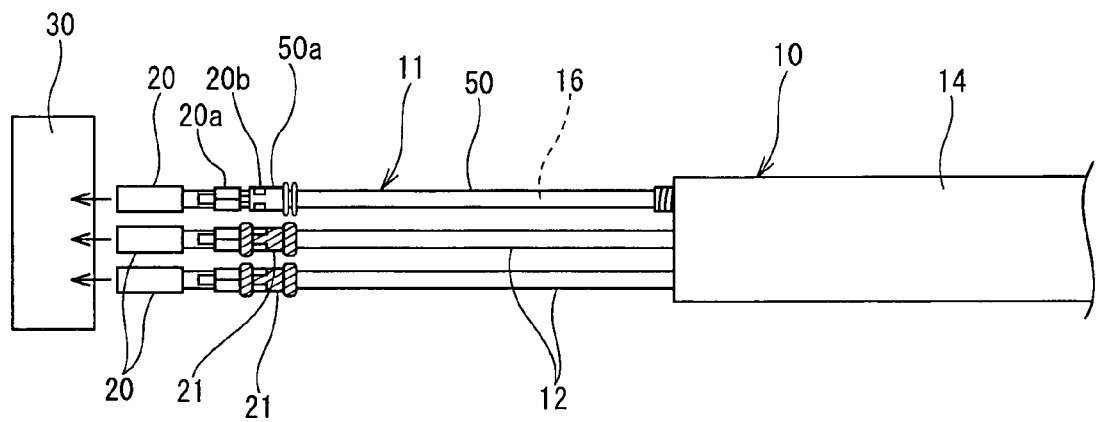
FIG. 11 shows a second embodiment of the present invention.
Figure 12:
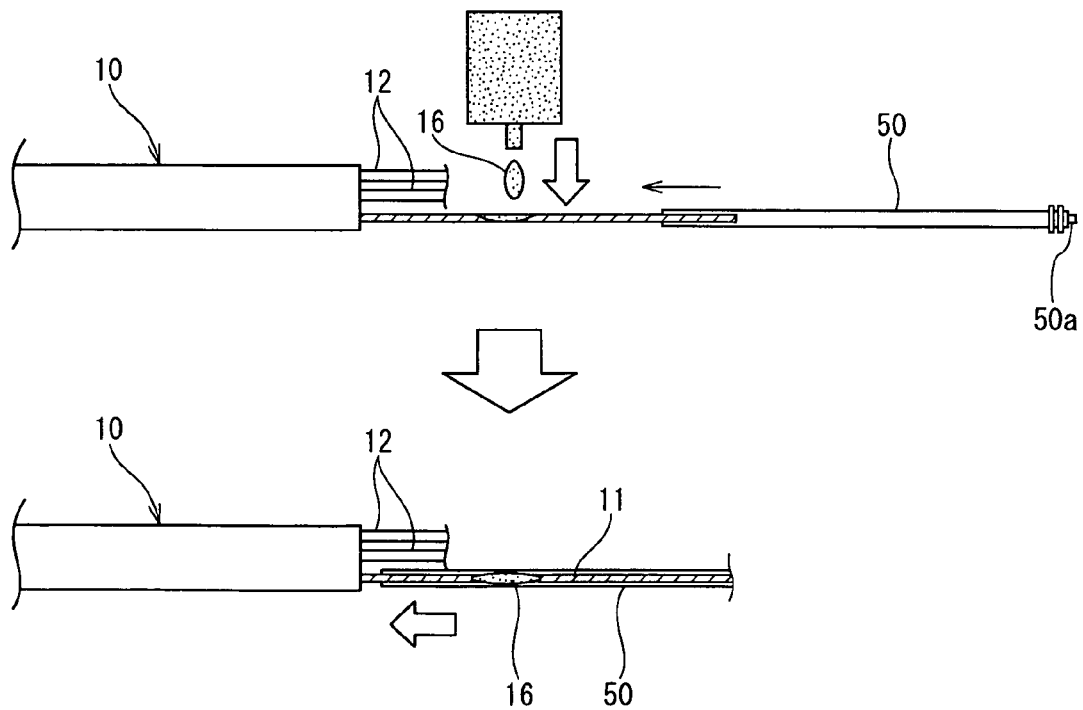
FIG. 12 shows a method for water-stopping a drain wire in the second embodiment of the present invention.

FIGS. 11 and 12 show the second embodiment of the present invention.

In the second embodiment, water-stopping processing is performed by mounting a rubber tube 50 containing silicone or EPDM (ethylene-propylene rubber) on the drain wire 11 led out from the end of the shielded wire 10 instead of the heat shrinkable tube and filling the water-stopping agent 16 inside the rubber tube 50.

A rubber stopper 50*a* having a configuration approximately the same as that of the rubber stopper of the first embodiment is formed integrally with a front end of the rubber tube 50 positioned at the end of the drain wire 11. One barrel 20*a* of the terminal 20 is mounted on the end of the drain wire 11 by solderless connection, whereas other barrel 20*b* thereof is mounted on the rubber stopper 50*a* of the rubber tube 50 by solderless connection.

A gap is formed between the other end of the rubber tube 50 and the cut position of the shielded wire 10. A tape 51 is wound around the rubber tube 50 in the range from the other end thereof to the cut position of the shielded wire 10.

Next, a method for stopping the penetration of water into the drain wire 11 having the above-described construction is described below.

Before the rubber tube 50 is mounted on the drain wire 11 exposed to the outside from the cut position of the shielded wire 10, the water-stopping agent (silicone) 16 is dripped to the drain wire 11 from above at an intermediate position thereof in its longitudinal direction.

Thereafter the rubber tube 50 is mounted on the drain wire 11 from the front end thereof. After a portion where the water-stopping agent 16 is dripped is covered with the rubber tube 50, the terminal 20 is mounted at the front end of the rubber tube 50 by solderless connection, and the tape 51 is wound round the other side of the rubber tube 50.

In the second embodiment, the tape 51 is wound round the other side of the rubber tube 50. But the other side of the rubber tube 50 may be covered with a waterproof heat shrinkable tube.

In the above-described construction, similarly to the first embodiment, the second embodiment has the construction which allows the drain wire to be provided with a slim portion to be water-stopped. Thus the second method has the same operation and effect as those of the first method. Further the second embodiment eliminates the need for the provision of the step of heating the heat shrinkable tube and allows the terminal to be directly mounted on the end of the rubber tube 50 by solderless connection, thus eliminating the need for the use of the rubber stopper and decreasing the number of parts and operation steps.

The water-stopping method of the second embodiment corresponds to the second water-stopping method of the first embodiment. By using the rubber tube 50 as in the case of the second embodiment, it is possible to adopt a method (step of heating the heat shrinkable tube 15 for shrinkage is excluded) corresponding to the first, third or fifth water-stopping method of the first embodiment.

Other constructions and operations and effects of the second embodiment are similar to those of the first embodiment. Thus the same parts of the second embodiment as those of the first embodiment are denoted by the same reference numerals as those of the first embodiment, and description thereof is omitted herein.

Figure 13:
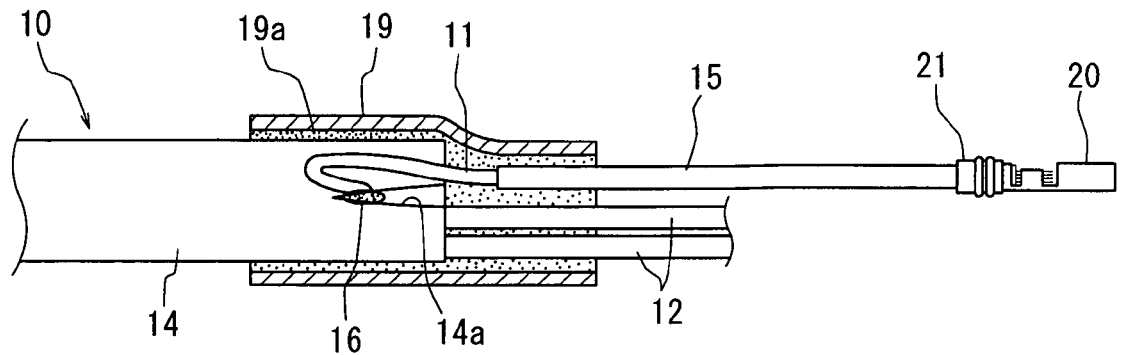
FIG. 13 shows a third embodiment of the present invention.

FIGS. 13 and 14 show the third embodiment of the present invention.

In the third embodiment, at the cut position of the shielded wire 10, there is formed a triangular slit 14a extended in the longitudinal direction of the sheath 14 by cut-out. The drain wire 11 is led out through the slit 14a. The drain wire 11 is led out from the slit 14a in a direction opposite to the position of the cut position of the sheath 14 and held at a narrow portion of the slit 14a. The drain wire 11 led out is folded back to the cut position of the sheath 14 at a necessary portion.

The water-stopping agent 16 is filled between the strands of the drain wire 11 at a position where the drain wire 11 is led out, whereas the non-waterproof heat shrinkable tube 15 is heated to shrink it with the front side of the drain wire 11 covered with a non-waterproof heat shrinkable tube 15. The rubber stopper 21 is mounted at the front end of the non-waterproof heat shrinkable tube 15, and the terminal 20 is mounted on the end of the drain wire 11 by solderless connection.

A portion of the drain wire 11 exposed between the sheath 14 and the non-waterproof heat shrinkable tube 15 is covered with the waterproof heat shrinkable tube 19 and heated for shrinkage. The end portion of the non-waterproof heat shrinkable tube 15 at the shielded wire side is covered with one side of the waterproof heat shrinkable tube 19, whereas the slit 14a of the sheath 14 is covered with the other side of the waterproof heat shrinkable tube 19. Thereby the periphery of the portion of the drain wire 11 exposed to the outside between the sheath 14 and the non-waterproof heat shrinkable tube 15 is covered with the water-stopping agent 19a of the waterproof heat shrinkable tube 19.

Next, a method (sixth method) for stopping water from penetrating into the drain wire 11 having the water-stopping construction is described below.

Figure 14A:
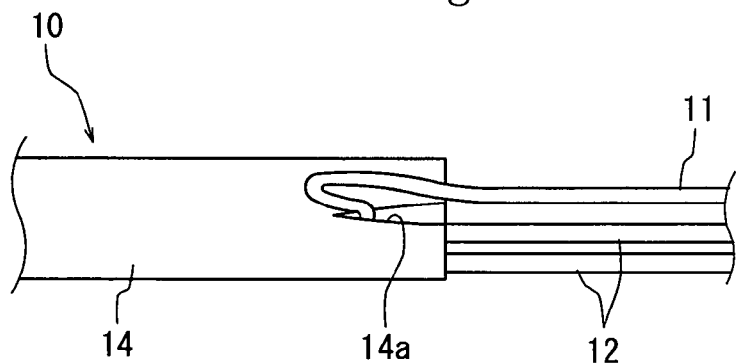
FIGS. 14(A) and 14(B) show a method (sixth method for water-stopping the drain wire) for water-stopping a drain wire in the third embodiment of the present invention.

Initially as shown in FIG. 14(A), the core wire 12 is led out from the end of the sheath 14, and the drain wire 11 is led out through the slit 14a formed at the cut position of the sheath 14.

Figure 14B:
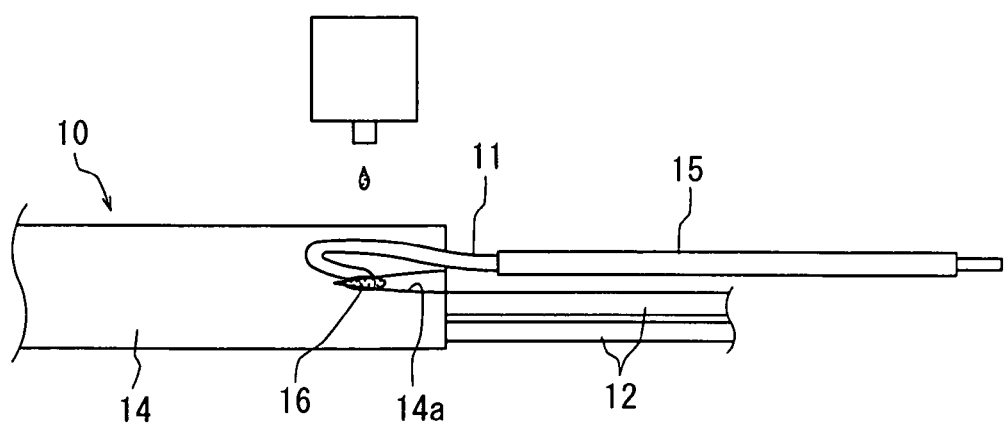
Figure 15A:
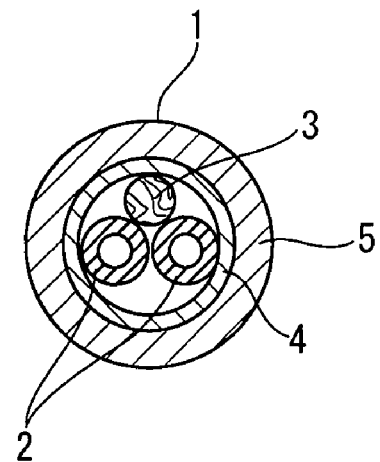
FIGS. 15(A) and 15(B) show a conventional art.
Figure 15B:
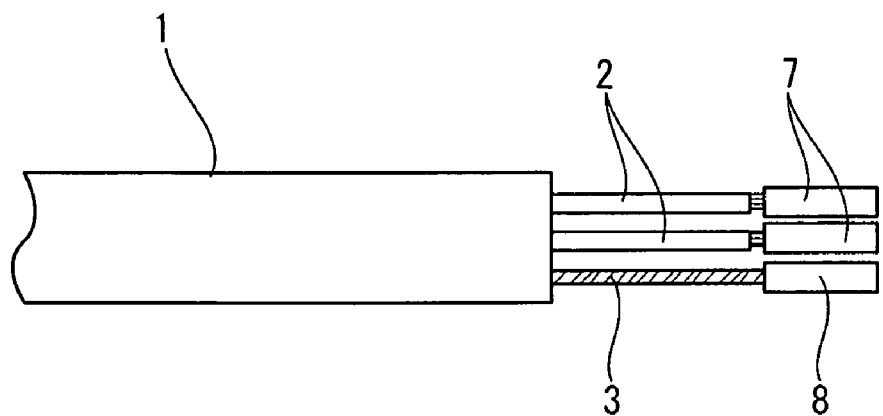
Figure 16:
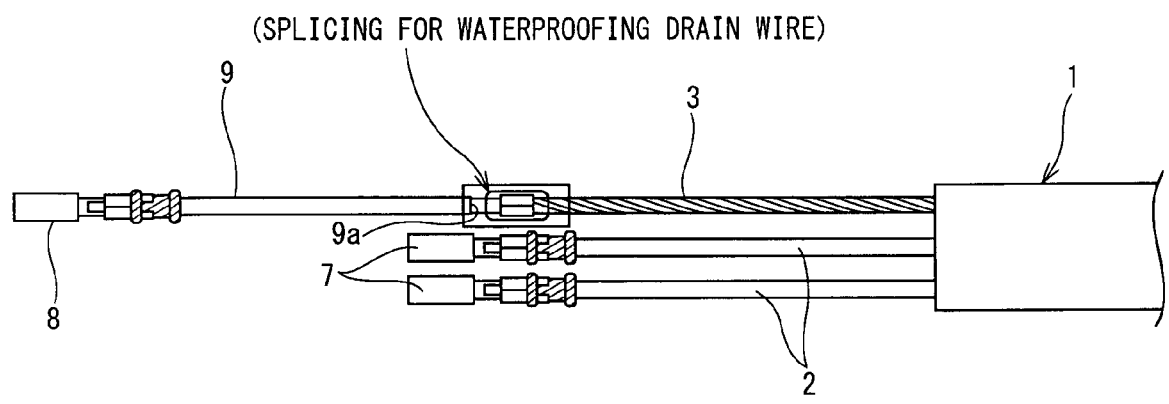
FIG. 16 shows another conventional art.

Thereafter as shown in FIG. 14(B), the non-waterproof heat shrinkable tube 15 is mounted at the front side of the drain wire 11 and heated to shrink it.

Thereafter the water-stopping agent 16 is dripped to the slit 14a and held therein, and the waterproof heat shrinkable tube 19 is mounted on the drain wire 11 exposed between the sheath 14 and the non-waterproof heat shrinkable tube 15 and heated to shrink it.

Thereafter the rubber stopper 21 is mounted at the front end of the drain wire 11, and the terminal 20 is mounted thereon by solderless connection.

In the above-described construction, similarly to the first embodiment, the third embodiment has a construction which allows the drain wire to be provided with a slim portion to be water-stopped. Thus the third embodiment has the same operation and effect as those of the first embodiment. Further in the third embodiment, because it is unnecessary to suck air, it is unnecessary to provide an air-sucking means and possible to decrease an operation period of time. In addition, because the water-stopping agent 16 is dripped to the slit 14a of the sheath 14 and held therein, it is possible to quantitatively manage the water-stopping agent.

Instead of the non-waterproof heat shrinkable tube of the third embodiment, the rubber tube of the second embodiment may be used.

Other constructions and operations and effects of the third embodiment are similar to those of the first embodiment. Thus the same parts of the third embodiment as those of the first embodiment are denoted by the same reference numerals as those of the first embodiment, and description thereof is omitted herein.

The invention claimed is:

1. A method for stopping water from penetrating into a drain wire contained in a shielded wire, comprising the steps of:

stripping a necessary length of a sheath of said shielded wire from a front end of said sheath, and leading out a drain wire and an insulated electric wire, wherein the drain wire is in contact with a shielding material made of a metal braid or metal foil and the insulated electric wire serves as a core wire; and inserting said drain wire into a heat shrinkable tube having an obliquely cut portion or a slit portion formed by cut-out at a front end thereof, dripping a water-stopping agent to said obliquely cut portion or said slit portion and placing said water-stopping agent therein, and thereafter heating said heat shrinkable tube for shrinkage, wherein after said drain wire is midway inserted into said heat shrinkable tube, said water-stopping agent is dripped to and held in said obliquely cut portion or said slit portion, and in this state, said heat shrinkable tube is moved to a cut position of said shielded wire.

2. A method for stopping water from penetrating into a drain wire contained in a shielded wire, comprising the steps of:

stripping a necessary length of a sheath of said shielded wire from a front end of said sheath, and leading out a drain wire and an insulated electric wire, wherein the drain wire is in contact with a shielding material made of a metal braid or a metal foil and the insulated electric wire serves as a core wire; and inserting said drain wire into a heat shrinkable tube having an obliquely cut portion or a slit portion formed by cut-out at a front end thereof, dripping a water-stopping agent to said obliquely cut portion or said slit portion and placing said water-stopping agent therein, and thereafter heating said heat shrinkable tube for shrinkage, wherein said shielded wire is disposed on a horizontal placing surface of a jig; said heat shrinkable tube through which said drain wire has been inserted is disposed on an inclined surface inclined downward from a side edge of said horizontal placing surface of said jig; and said water-stopping agent is dripped to said obliquely cut portion or said slit portion of said heat shrinkable tube disposed at an upper position of said inclined surface.

3. A method for stopping water from penetrating into a drain wire contained in a shielded wire, comprising the steps of:

stripping a necessary length of a sheath of said shielded wire from a front end of said sheath, and leading out a drain wire and an insulated electric wire, wherein the drain wire is in contact with a shielding material made of a metal braid or a metal foil and the insulated electric wire serves as a core wire; and inserting said drain wire into a rubber tube having an obliquely cut portion or a slit portion formed by cut-out at a front end thereof, thereafter dripping a water-stopping agent to said obliquely cut portion or said slit portion and placing said water-stopping agent therein, wherein said shielded wire is disposed on a horizontal placing surface of a jig; said rubber tube through which said drain wire has been inserted is disposed on an inclined surface inclined downward from a side edge of said horizontal placing surface of said jig; and said water-stopping agent is dripped to said obliquely cut portion or said slit portion of said rubber tube disposed at an upper position of said inclined surface.

4. A method for stopping water from penetrating into a drain wire contained in a shielded wire, comprising the steps of:
- stripping a necessary length of a sheath of said shielded wire from a front end of said sheath, and leading out a drain wire and an insulated electric wire, wherein the drain wire is in contact with a shielding material made of a metal braid or a metal foil and the insulated electric wire serves as a core wire; and
- inserting said drain wire into a heat shrinkable tube having an obliquely cut portion or a slit portion formed by cut-out at a front end thereof, dripping a water-stopping agent to said obliquely cut portion or said slit portion and placing said water-stopping agent therein, and thereafter heating said heat shrinkable tube for shrinkage, wherein said heat shrinkable tube is a non-waterproof heat shrinkable tube whose inner surface is not provided with said water-stopping agent until after the drain wire is inserted and the water-stopping agent is dripped;
- a front end of said obliquely cut portion or said slit portion of said non-waterproof heat shrinkable tube is covered with one side of a waterproof heat shrinkable tube whose inner surface is provided with said water-stopping agent with other end of said waterproof heat shrinkable tube in contact with a cut position of said shielded wire; and
- said waterproof heat shrinkable tube and said non-waterproof heat shrinkable tube are heated for shrinkage.

5. A method for stopping water from penetrating into a drain wire contained in a shielded wire, comprising the steps of:
- stripping a necessary length of a sheath of said shielded wire from a front end of said sheath, and leading out a drain wire and an insulated electric wire, wherein the drain wire is in contact with a shielding material made of a metal braid or a metal foil and the insulated electric wire serves as a core wire; and
- inserting said drain wire into a rubber tube having an obliquely cut portion or a slit portion formed by cut-out at a front end thereof, thereafter dripping a water-stopping agent to said obliquely cut portion or said slit portion and placing said water-stopping agent therein,
- wherein a front end of said obliquely cut portion or said slit portion of said rubber tube is covered with one side of a waterproof heat shrinkable tube whose inner surface is provided with a water-stopping agent with other end of said waterproof heat shrinkable tube in contact with a cut position of said shielded wire; and
- said waterproof heat shrinkable tube is heated for shrinkage.

6. A method for stopping water from penetrating into a drain wire contained in a shielded wire, comprising the steps of:
- stripping a necessary length of a sheath of said shielded wire from a front end of said sheath, and leading out a drain wire and an insulated electric wire, wherein the drain wire is in contact with a shielding material made of a metal braid or a metal foil and the insulated electric wire serves as a core wire;
- inserting said drain wire into a heat shrinkable tube having an opening formed by cutting out a necessary portion thereof and exposing said drain wire from said opening;
- dripping a water-stopping agent to said opening and placing said water-stopping agent therein, and in said state, heating said heat shrinkable tube for shrinkage; and
- covering said opening with a waterproof heat shrinkable tube and heating said waterproof heat shrinkable tube for shrinkage.

* * * * *